(12) United States Patent
Huang et al.

(10) Patent No.: US 8,261,318 B2
(45) Date of Patent: *Sep. 4, 2012

(54) METHOD AND APPARATUS FOR PASSING SECURITY CONFIGURATION INFORMATION BETWEEN A CLIENT AND A SECURITY POLICY SERVER

(75) Inventors: Geoffrey Huang, Mountain View, CA (US); Jan Vilhuber, San Luis Obispo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/888,289

(22) Filed: Sep. 22, 2010

(65) Prior Publication Data

US 2011/0016509 A1 Jan. 20, 2011

Related U.S. Application Data

(63) Continuation of application No. 10/226,887, filed on Aug. 22, 2002, now Pat. No. 7,849,495.

(51) Int. Cl.
*H04L 9/00* (2006.01)
(52) U.S. Cl. .............................. 726/1; 713/153; 713/154
(58) Field of Classification Search .......... 726/1, 11–15; 713/153, 154, 150; 709/221, 225, 228, 238
See application file for complete search history.

(56) References Cited

U.S. PATENT DOCUMENTS

| 6,233,688 | B1 * | 5/2001 | Montenegro | 726/11 |
| 6,330,562 | B1 * | 12/2001 | Boden et al. | 713/167 |
| 6,671,731 | B1 | 12/2003 | Cain | |
| 2002/0144144 | A1 | 10/2002 | Weiss et al. | |

OTHER PUBLICATIONS

Stallings, Network and Internetwork Security, 1995, Prentice-Hall, pp. 326-327.
Harkins, D. et al., "The Internet Key Exchange (IKE)," Nov. 1998, pp. 1-41.
Maughan, D. et al., "Internet Security Association and Key Management Protocol (ISAKMP)," Nov. 1998, pp. 1-86.
Kent, S. et al., "Security Architecture for the Internet Protocol," Nov. 1998, pp. 1-66.
Dukes, D. et al., "The ISAKMP Configuration Method, draft-dukes-ie-mode-cfg.02.txt," Sep. 2001, pp. 1-13.

* cited by examiner

*Primary Examiner* — Beemnet Dada (74) *Attorney, Agent, or Firm* — Hickman Palermo Truong Becker Bingham Wong LLP; Adam C. Stone (57) ABSTRACT

Techniques for passing security configuration information between a security policy server and a client includes the client forming a request for security configuration information that configures the client for secure communications. The client is separated by an untrusted network from a trusted network that includes the security policy sever. A tag is generated that indicates a generic security configuration attribute. An Internet Security Association and Key Management Protocol (ISAKMP) configuration mode request message is sent to a security gateway on an edge of the trusted network connected to the untrusted network. The message includes the request in association with the tag. The gateway sends the request associated with the tag to the security policy server on the trusted network and does not interpret the request. The techniques allow client configuration extensions to be added by modifying the policy server or security client, or both, without modifying the gateway.

22 Claims, 7 Drawing Sheets

METHOD AND APPARATUS FOR PASSING SECURITY CONFIGURATION INFORMATION BETWEEN A CLIENT AND A SECURITY POLICY SERVER

CROSS-REFERENCE TO RELATED APPLICATION(S); PRIORITY CLAIM

This application claims the benefit as a Continuation of application Ser. No. 10/226,887, filed Aug. 22, 2002 now U.S. Pat. No. 7,849,795 the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention generally relates to configuring a client for secure communications over a network. The invention relates more specifically to passing security configuration information between a client and a security policy server using the Internet Security Association and Key Management Protocol (ISAKMP).

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

There is an increasing demand for using untrusted networks, like the Internet, for secure transmission of private and confidential information. An untrusted network includes one or more networking devices that are not under control of the parties sharing the private or confidential information. A variety of interacting protocols have been developed to support secure transmissions over untrusted networks. For example, an IPSec protocol has been promulgated to support virtual private networks (VPNs) over wide area networks that employ the Internet Protocol (IP) for data packet switching. IPSec is an open standard protocol for secure data transfer within IP data packets, as described in Request For Comments (RFC) 2401, among others, available at the time of this writing on the World Wide Web (www) at domain ietf.org.

IPSec involves the use of secret long integers, called keys, to encrypt and decrypt payloads sent in Internet Protocol (IP) data packets, or to authenticate sources of those data packets, or to ensure the payloads have not been tampered, or to perform some combination of these functions. Establishing one or more pairs of keys to use in secure communications, at least temporarily, between two or more communicating parties ("peers") requires some key exchange mechanism. The peers are typically network devices, such as routers, at the edge of the untrusted portion of the network.

Internet Security Association and Key Management Protocol (ISAKMP) provides a framework for authentication and key exchange and is designed to support many different key exchanges. ISAKMP is described in RFC 2408, available at the time of this writing at domain ietf.org. A security association (SA) describes how peers utilize security services to communicate securely. For example, an IPSec security association for a set of peers defines the encryption algorithm, if any, the authentication algorithm, and the shared session key to be used during an IPSec connection. A particular combination of values identifying an encryption algorithm, an authentication method, a one-way hash function, a parameter in an exchange algorithm, and a lifetime for the security association forms a particular security policy for the security association. A security association for a set of peers is made up of the particular policy and the actual keys determined after the exchange. The Internet Key Exchange (IKE) is one protocol for generating and exchanging keys within the ISAKMP framework for IPSec. IKE is described in RFC 2409, available at the time of this writing at domain ietf.org.

An extension of ISAKMP, called ISAKMP "Config Mode," allows a remote client communicating over an untrusted network to connect to a trusted network through a gateway and be configured by a policy server on the trusted network for IKE secure communications. Config Mode is described in a document available, as of this writing, as file "draft-dukes-ike-mode-cfg-latest.txt" at domain and directory employees.org/~ddukes on the World Wide Web. Example known policy servers include a Remote Access Dial-In User Service (RADIUS) server and a Terminal Access Controller Access Control System Plus (TACACS+) server, among others.

The gateway on the edge of the trusted network connected to the untrusted network receives an ISAKMP Config Mode request message from the client for security configuration information. In some configurations, the gateway uses information in the ISAKMP Config Mode request message to generate a request according to the protocol of the policy server, e.g., using the RADIUS or TACACS+ protocol. The policy server authenticates the client and determines which IKE secure services the client is authorized to obtain. The IKE parameters are returned to the gateway. The gateway uses this information to generate and send an ISAKMP Config Mode reply message to the client. The client uses the information in the ISAKMP Config Mode reply message to configure itself for secure communications with the gateway. The peers in the subsequent IPSec communications are the client and the gateway. One or more additional ISAKMP request and reply messages may be undertaken to establish the security association for IPSec tunnels between the client and the gateway over the untrusted network.

A problem arises with Config Mode when the security policy for a remote client is extended with additional security attributes. In addition to the security association shared by the gateway and the client, there may be additional behavior demanded or allowed of the client that does not involve its communication with the gateway, but rather its behavior toward other hosts connected to the trusted and untrusted networks. This additional behavior is described in additional security attributes of an extended security policy. For example, an additional security attributes might include a firewall policy to employ at the client edge of the untrusted network, among other additional attributes.

If the gateway does not know how to interpret the request for additional attributes in the ISAKMP Config Mode request, then the gateway does not know how to construct the message to send to the policy server according to the policy server protocol. If the gateway does not know how to interpret the message from the policy server, which includes the additional information from the policy server, then the gateway does not know how to construct the ISAKMP Config Mode reply message to send to the client. Therefore, when new security attributes are added to an extended security policy, the policy server and client are modified to use the new security attributes, and the gateway also must be modified to handle the new security attributes in Config Mode. The gateway Config Mode process is modified even when the new security attributes do not affect the security association between the gateway and client.

Reprogramming security gateways with each new security attribute used to configure remote clients is undesirable. Many different devices, with different software and different operating systems serve as security gateways. Modifications to all of them may involve multiple reprogramming efforts and extensive testing to ensure corresponding behavior in similar circumstances. In addition, because updated versions of these devices and software are released at different times, it is difficult to synchronize the behavior of all these devices with respect to new features, such as new security attributes exchanged via Config Mode.

Based on the foregoing, there is a clear need for techniques that allow security policy attributes for remote clients to be extended without reprogramming security gateways with each extension. In particular, there is a need for techniques that allow IKE policy attributes for remote clients to be extended without reprogramming an ISAKMP gateway.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for passing security configuration information between a security policy server and a client are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Passing Security Configuration Information
   3.1 Client
   3.2 Security Gateway
   3.3 Security Policy Server
   3.4 Alternative Information Passing Approach
4.0 Implementation Mechanisms—Hardware Overview
5.0 Extensions and Alternatives

- - -

1.0 General Overview

The needs identified in the foregoing Background, and other needs and objects that will become apparent for the following description, are achieved in the present invention, which comprises, in one aspect, a method for passing security configuration information between a security policy server and a client. The client is separated by an untrusted network from a trusted network that includes the security policy sever. The client forms a request for security configuration information that configures the client for secure communications. A tag is generated that indicates a generic security configuration attribute. An Internet Security Association and Key Management Protocol (ISAKMP) configuration mode request message is sent to a security gateway on an edge of the trusted network connected to the untrusted network. The message includes the request in association with the tag. The gateway sends the request associated with the tag to the security policy server on the trusted network and does not interpret the request.

According to another aspect, the security gateway receives an ISAKMP configuration mode request message from the client. The message includes a tag that indicates a generic security configuration attribute and a request for configuration information. The request is associated with the tag. In response to receiving the message, the gateway sends the request associated with the tag to the security policy server without interpreting the request.

According to another aspect, the security gateway receives a first message for the client from the security policy server. The first message includes a tag that indicates a generic security configuration attribute and a response with configuration information used to configure the client for secure communications. The response is associated with the tag. In response to receiving the first message, without interpreting the response, the gateway sends to the client an ISAKMP configuration mode reply message that includes the response associated with the tag.

According to another aspect, a response is formed at the security policy server. The response includes configuration information used to configure the client for secure communications. The security policy server generates a tag that indicates a generic security configuration attribute and sends a message to the security gateway. The message includes the response in association with the tag. The gateway includes the response in association with the tag in an ISAKMP configuration mode reply message sent to the client, and the gateway does not interpret the response.

In other aspects, the invention encompasses a computer apparatus, a computer readable medium, including a carrier wave, and a system configured to carry out the foregoing steps.

2.0 Structural and Functional Overview

Figure 1:
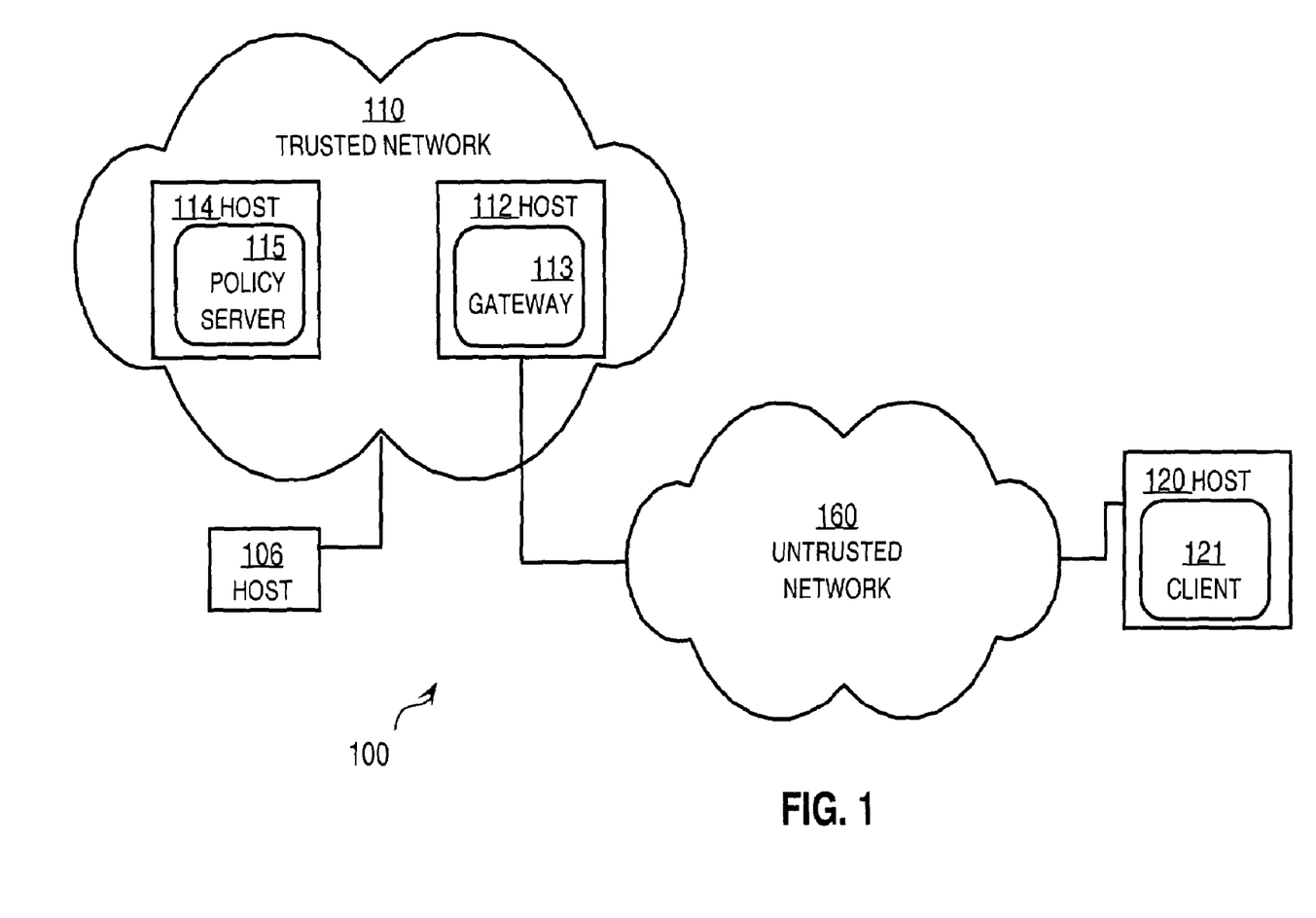
FIG. 1 is a block diagram that illustrates an overview of a system in which a client is configured by a security policy server for secure communications.

FIG. 1 is a block diagram that illustrates an overview of a system 100 in which a client 121 is configured by a security policy server 115 for secure communications. In this context, a "client" is a process executing on a computer device that sends a message that requests a service from a separate server process on a second device. The computer devices are also called "hosts." The second device is typically different from the first device and the two hosts communicate over one or more intervening networks. The term "client" may be used for both the process that requests the service and the host on which the process executes, and the term "server" may be used for both the process that provides the service and the host on which the process executes. As used herein, the terms "client" and "server" refer to the corresponding processes rather than to the hosts, unless otherwise indicated.

To illustrate passing security configuration information between a client and a security policy server, in FIG. 1 client 121 on host 120 is separated from a trusted network 110 by an untrusted network 160. The trusted network 110 includes a security policy server 115 on host 114. The trusted network includes a host 112 that is connected to the untrusted network 160. The host 112 is typically a router on an edge of the trusted network. A process called a "gateway" 113 executes on the host 112 to control the passage of data packets between the trusted network 110 and the untrusted network 160. Although the security policy server 115 is shown on a different host 114 from the host 112 of gateway 113, the security policy server 115 also may execute on the same host 112 as gateway 113.

The client 121 may be any process that supports secure communications involving host 120. In some embodiments, the client 121 is a plug-in process that interacts with a world wide web browser process, and the host 120 is a personal computer. Alternatively, the client is a gateway for another trusted network, not shown, and the host 120 is a router on the edge of the other trusted network.

The trusted network 110 is any network over which secure communications are accomplished. For example, the trusted network 110 is secure by virtue of physical controls over an office, building or campus. Alternatively, the trusted network 110 is secure by virtue of secure protocols established between network elements. In some embodiments, the trusted network is secure by a combination of physical controls and secure protocols.

Host 106 is connected to or part of trusted network 110 and represents a host for one or more processes. After the client 121 is configured for secure communications, the client may communicate securely with a process on host 106.

As described in the Background section, when a client connected to untrusted network 160 desires to establish secure communications with trusted network 110, the client 121 sends an ISAKMP Config Mode request message for configuration information. In a conventional approach, the ISAKMP Config Mode request message is received by gateway 113, which interprets the information in the message. Gateway 113 then generates a policy server request message with data indicating a request for information to be used in a security association for communications between gateway 113 and client 121.

The policy server request message is sent to policy server 115. The policy server 115 generates information for the security association to be used between the gateway 113 and the client 121 and sends the information in a policy server response message to the gateway 113. The policy server response message is received by gateway 113, which interprets the information in the message. Gateway 113 then generates an ISAKMP Config Mode reply message with data indicating the information to be used in a security association for communications between gateway 113 and client 121. The ISAKMP Config Mode reply message is then sent to client 121.

Figure 2:
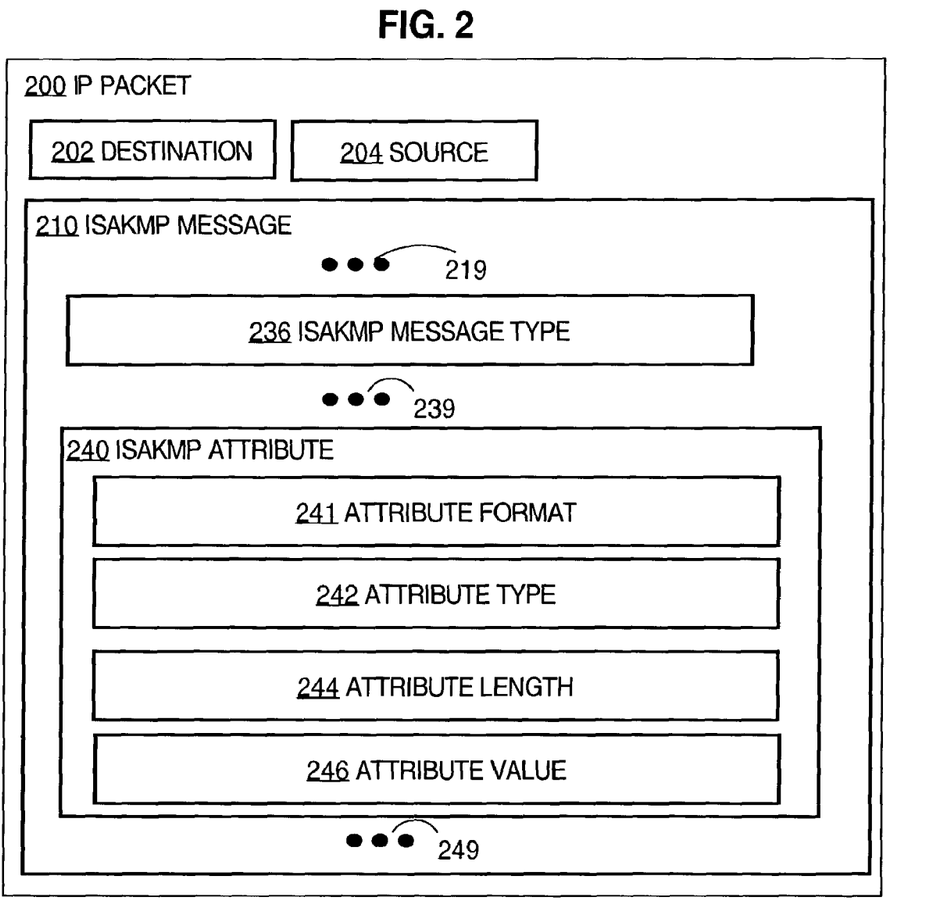
FIG. 2 is a block diagram that illustrates an ISAKMP message passed between the client and a security gateway.

FIG. 2 is a block diagram that illustrates an ISAKMP message 210 passed between the client 121 and the gateway 113. The ISAKMP message 210 is passed in an IP packet 200 that includes a destination field 202 and a source field 204. The destination field 202 holds data that indicates a destination address to which the IP packet is directed. The destination address is used to route the IP packet 200 over an IP network, such as untrusted network 160. The source field 204 holds data that indicates an IP address of the host that sent the message. Among other uses, the source IP address is used at the destination to determine where to send a reply, if any.

The ISAKMP message 210 is included as a payload of the IP packet 200. The ISAKMP message 210 includes a message type field 236 for holding data that indicates an ISAKMP message type. The data in message type field 236 indicates whether the ISAKMP message is a Config Mode request message for requesting security configuration information, a Config Mode reply message for returning security configuration information, or some other ISAKMP type message, such as a message for exchanging keys outside the Config Mode protocol. Other fields in a header portion of the ISAKMP message, before and after the message type field 236 are indicated by ellipses 219, 239, respectively.

The ISAKMP message 210 also includes an ISAKMP attribute 240 for holding data that indicate one or more values for an attribute defined for ISAKMP. For example, ISAKMP attributes include parameters of a security association, such as an identifier for an encryption algorithm, an identifier for an authentication method, an identifier for a one-way hash function, an identifier for the exchange algorithm, a parameter for the exchange algorithm, and a lifetime for the security association, among others. ISAKMP attributes may vary widely in form, from short numbers to long strings of characters. ISAKMP expresses each attribute in three or four fields of the following four fields: an attribute format field 241, an attribute type field 242, an attribute length field 244, and an attribute value field 246.

The attribute format (also called the "AF") field 241 is a one binary digit (bit) field that holds a single bit (the "AF bit") that indicates whether the attribute value is contained in a default, fixed-length field or a variable-length field. If the AF bit is one (1), then the attribute value is indicated by data in an attribute value field 246 that is 16-bits in size. In this case, the attribute length field 244 is omitted. If the AF bit is zero (0), then the attribute value is indicated by data in an attribute value field 246 that is greater than 16-bits in size. In this case, a 16-bit attribute length field 244 is included that holds data indicating a number of bits for the size of the attribute value field 246. Therefore, the attribute value is indicated by data in an attribute value field 246 that has the number of bits specified in the attribute length field 244.

Other attributes, if any, included in ISAKMP message 210 are indicated by ellipsis 249.

In the new approach described herein, a configuration mode generic attribute type is defined for and used in the attribute type field 242. For the configuration mode generic attribute type, values in the attribute value field 246 are interpreted by a security policy server or a security client, or both, but the values in the attribute value field are not interpreted by a gateway. For example, an attribute type "16528" corresponding to attribute type name "CFG_MODE_GENERIC_ATT" (a mnemonic for "configuration mode generic attribute") is defined in a domain of interpretation (DOI) for ISAKMP. The security gateway 113 operating on ISAKMP messages is programmed not to interpret the contents of the attribute value field 246 when the data in the attribute type field 242 equals 16528. The gateway is programmed to pass the values in the attribute value field 246 between client 121 and security policy server 115 as data that is not acted upon ("opaque data") when the data in the attribute type field 242 equals 16528.

By passing opaque data through a gateway between a security client and a security policy server, further extensions can be added to the security policy parameters that affect the client, as additional security attributes, without modifying the gateway. Only the security client and the security policy server are modified further to add the extensions. For example, additional security attributes might include a limit on lifetimes for the IPSec security associations established between the client and other peers, network locations of the most up-to-date software to implement security algorithms on the client, a firewall policy to employ at the client edge of the untrusted network, or usage warnings to be displayed on the client in a banner or other graphic element, among other additional attributes.

In some embodiments, when the data in the attribute type field 242 indicates the configuration mode generic attribute type, the client is also modified to pass, in the attribute value field 246, data that is formatted according to the protocol used by the security policy server, such as RADIUS, TACACS+, or Lightweight Directory Access Protocol (LDAP), among others.

In some embodiments, the client requests the type of security policy server so that data included in attribute value field 246 is formatted properly for the protocol of the security policy server. According to such embodiments, a second new attribute type is defined for and used in the attribute type field 242. The second new attribute type is a configuration mode generic policy server type, which indicates the type of policy server that the gateway uses to authenticate a user of a client and obtain security configuration information for the client. For example, an attribute type "16529" corresponding to attribute type name "CFG_MODE_GENERIC_POLSERV_TYPE," (a mnemonic for "configuration mode generic policy server type") is defined in the DOI for ISAKMP. The security gateway 113 operating on ISAKMP messages is programmed to respond with data that indicates a policy server type when the data in the attribute type field 242 equals "16529" in an ISAKMP request. For example, the gateway responds with an ISKMP message in which the data in the attribute type field 242 equals "16529" and the data in the attribute value field 246 indicates the policy server type.

Any association between a value and a policy server type can be used. For purposes of illustration, it is assumed that the policy server types and associated values of the CFG_MODE_GENERIC_POLSERV_TYPE attribute are as indicated in Table 1.

TABLE 1

Values of policy server type attribute and corresponding security policy servers.

| Security Policy Server | Value of attribute of type 16529 (CFG_MODE_GENERIC_POLYSERV_TYPE) |
|---|---|
| reserved | 0 |
| RADIUS | 1 |
| TACACS+ | 2 |
| LDAP | 3 |

Figure 3:
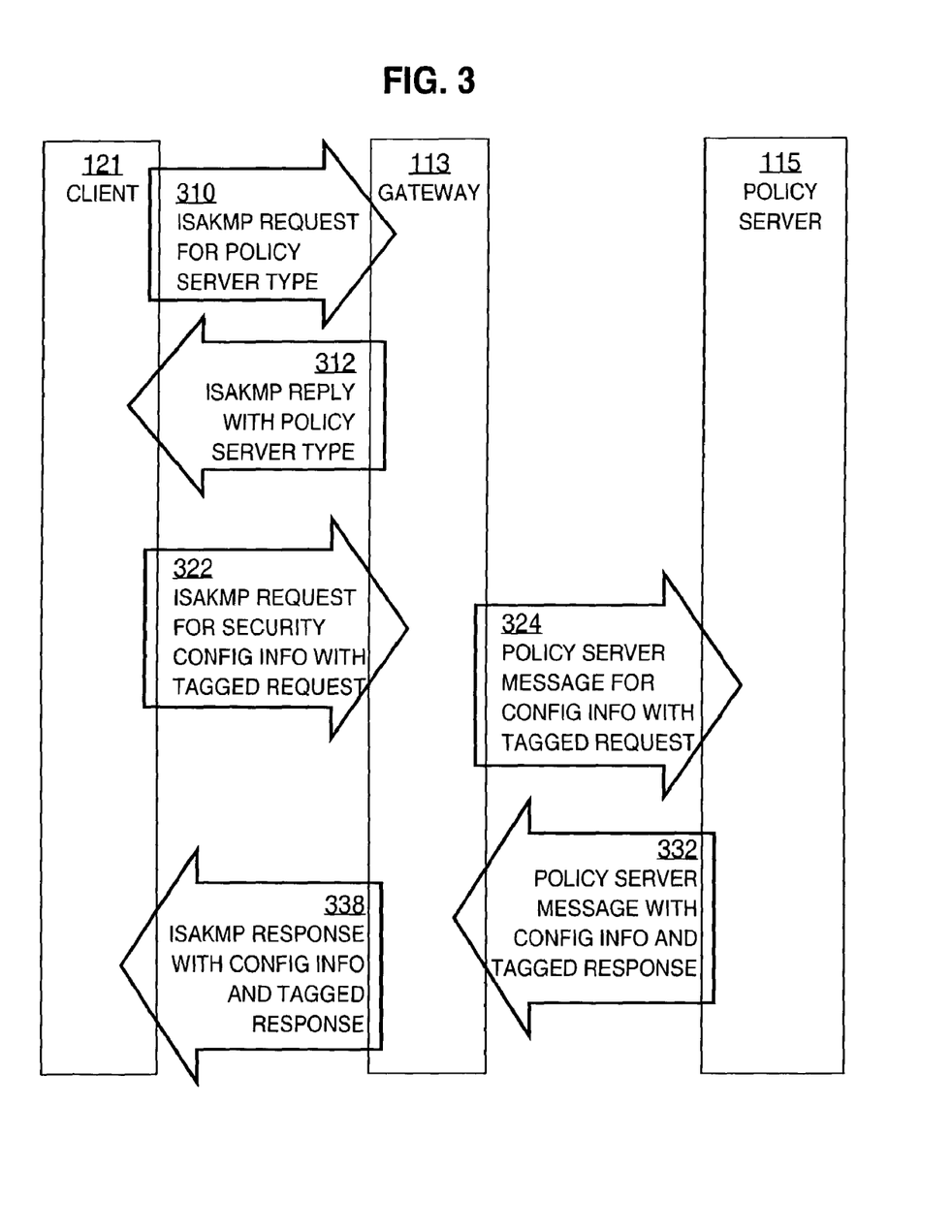
FIG. 3 is a time-line diagram that illustrates a sequence of messages passed among the client, the security policy server and the gateway, according to an embodiment.

FIG. 3 is a time-line diagram that illustrates a sequence of messages passed among the client 121, the security policy server 115 and the gateway 113, according to an embodiment in which the client first requests the type of security policy server. Time increases downward in FIG. 3.

At time t0, the client 121 sends an ISAKMP Config Mode request message 310 that includes data indicating a request for the type of security policy server. In response, at time t1 after time t0, the gateway 113 returns an ISAKMP Config Mode reply message 312 with data indicating the security policy server type.

At time t2, the client 121 sends an ISAKMP Config Mode request message 322 that includes data that indicates one or more requests for configuration information for the client. At least one of the requests is in an attribute value field 246 of an attribute 240 having attribute type of "16528" (i.e., an attribute type CFG_MODE_GENERIC_ATT) in the attribute type field 242. The attribute type serves as a tag (such as an extensible markup language ["XML"] tag) that indicates that the associated data (in the attribute value field 246) is a generic attribute of the configuration mode. Thus the value in the attribute value field 246 is tagged with the value "16528" in the attribute type field 242, which corresponds to the configuration mode generic attribute.

At time t3 after time t2, the gateway 113 sends a policy server request message 324 to the security policy server 115. The policy server request message 324 includes at least the one or more requests in the attribute value field 246 received from the client and tagged with the attribute type 16528 for CFG_MODE_GENERIC_ATT. Thus, the tagged request is sent to the policy server. In some embodiments, the tag is not included in the policy server message, such that message 324 includes the one or more tagged requests but does not include the tag "16528."

At time t4 after time t3, the security policy server 115 sends a policy response message 332 to the gateway 113. Message 332 includes at least one response to the one or more requests received from the client and tagged with the attribute type "16528" for the CFG_MODE_GENERIC_ATT. Thus, a response for the tagged request is sent by the policy server to the gateway 113. The tag is included in the policy server message in association with the response; the message 332 includes one or more tagged responses to the tagged requests.

At time t5 after time t4, the gateway 113 sends an ISAKMP Config Mode reply message 338 to the client 121. The Config Mode reply response message 338 includes at least the tagged responses with the attribute type "16528" for the CFG_MODE_GENERIC_ATT received from the policy server. Based on the tag "16528", the gateway passes the tag and values through to the ISAKMP Config Mode reply message, without attempting to interpret the contents of the response. Thus, a tagged response for the tagged request is sent by the gateway 113 to the client 121. The tag is included in the ISAKMP message in association with the response, such as in attribute type field 242 associated with attribute value field 246 in ISAKMP attribute 240.

Accordingly, security client configuration information is provided to a security client from a security policy server without interpretation by a security gateway. Such provisioning of security configuration information for the client allows client configuration extensions to be added by modifying the policy server or security client, or both, without modifying the gateway.

3.0 Method of Passing Security Configuration Information

Embodiments and examples of passing client security configuration information are described for the client, gateway and server, separately, in the following sections.

3.1 Client

Figure 4:
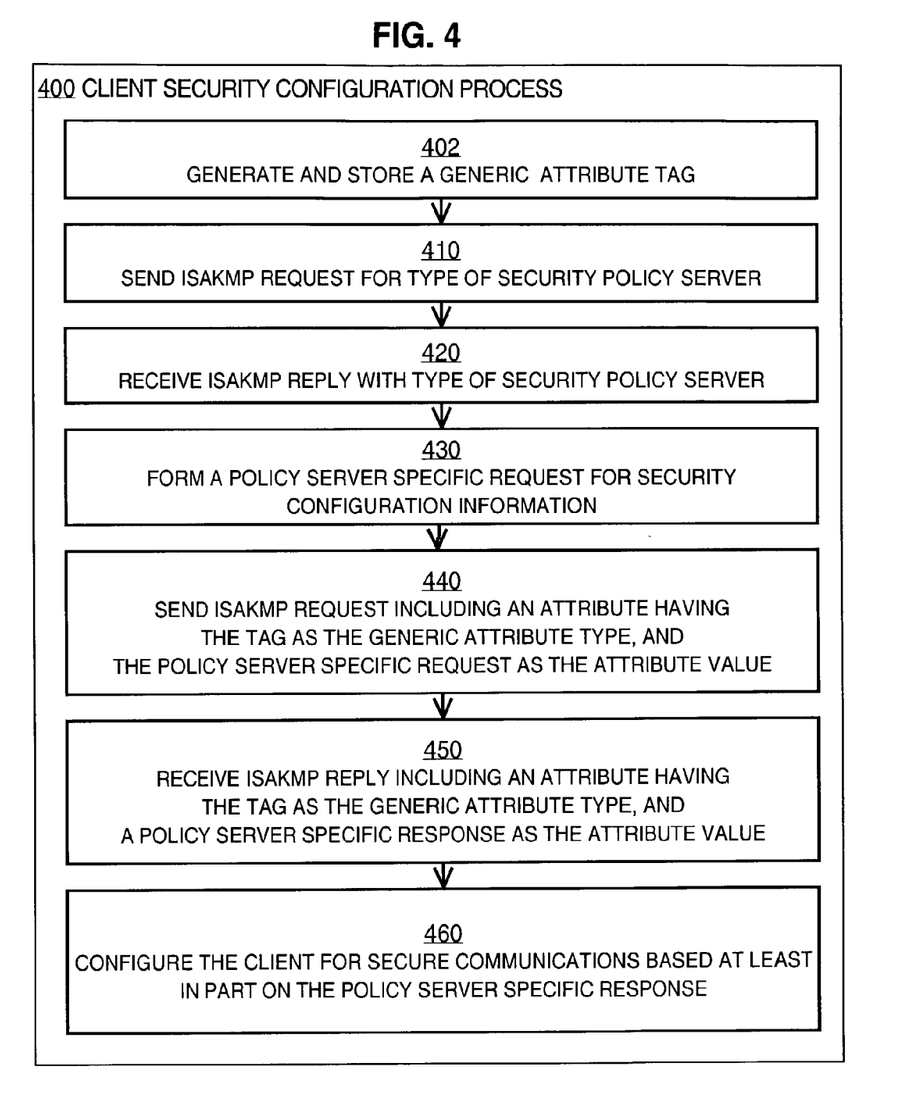
FIG. 4 is a flow diagram that illustrates a high level overview of one embodiment of a method for passing configuration information at the client.

FIG. 4 is a flow diagram that illustrates a high level overview of one embodiment of a method 400 at the client for passing client configuration information. In step 402, a generic attribute tag for Config Mode is generated and stored.

For example, the generic attribute tag "16528" named CFG_MODE_GENERIC_ATT is generated by the client, and in step 402 the client obtains the tag, stores it locally for use in subsequent steps by the client, and generates the tag when needed by retrieving the tag from storage. In some embodiments, step 402 includes generating and storing a security policy server type tag. For example, the generic attribute tag "16529," for CFG_MODE_GENERIC_POLSERV_TYPE, is generated by the client; and in step 402, the client obtains the tag and stores it locally for use in subsequent steps by the client.

In step 410 an ISAKMP request for a type of security policy server is sent to the gateway. For example, an ISAKMP Config Mode request message 310 with fields as specified in message 1 of Table 2 is sent from client 121 to gateway 113. Data indicating the message type "ISAKMP Config Mode request" is included in ISAKMP message type field 236. The number 16529 indicating CFG_MODE_GENEREIC_POLSERV_TYPE is included in the attribute type field 242. The AF field 241 is set to 1, indicating the attribute value has the default 16 bits (two 8-bit "bytes") size, so that an attribute length is not transmitted. The attribute value is ignored in the request; for purposes of illustration, it is assumed that the attribute value in the request is "0."

some client security configuration information that does not involve the gateway. Assume, for purposes of illustration, that: the client forms a RADIUS protocol request for a firewall policy to implement at the client and for a network location of software to download to implement IPSec on the client; the configuration values for a firewall policy are indicated by the RADIUS attribute named "ike-mode-config:firewall_policy"; that the location of software to download is given by a Universal Resource Locator (URL); and that values for the URL where IPSec software can be downloaded are indicated by the RADIUS attribute named "ipsec:software_update_url." Neither of these attributes is needed by the gateway. Assume further for purposes of illustration that ISAKMP attributes for this information have not been defined in the DOI for ISAKMP and are not understood by the gateway. The RADIUS specific request is formed by setting the attribute-value pair ("Avpair") equal to a quotation-mark-enclosed string listing the RADIUS attributes without equals signs, separated by semicolons. Thus the RADIUS specific requests for these two non-ISAKMP attributes is expressed as:

Avpair=ike-mode-config:firewall_policy;ipsec:software_update_url."

TABLE 2

Example values in fields of example ISAKMP messages.

| example message number | ISAKMP message type | AF | Attribute type | Attribute length | Attribute value |
|---|---|---|---|---|---|
| 1 | Config Mode Request | 1 | 16529 | not transmitted (==>2 bytes) | 0 |
| 2 | Config Mode Reply | 1 | 16529 | not transmitted (==>2 bytes) | 1 |
| 3 | Config Mode Request | 1 | 16528 | 65 bytes | Avpair= "ike-mode-config:firewall_policy; ipsec:software_update_url" |
| 4 | Config Mode Reply | 1 | 16528 | 128 bytes | Avpair= "ike-mode-config:firewall_policy= deny in tcp 22-80 udp; ipsec:software_update_url=http:// vpnupdate.x.com update_mandatory" |

In step 420 an ISAKMP Config Mode reply message for type of security policy server is received from the gateway. For example, an ISAKMP Config Mode reply message 312 with fields as specified in message 2 of Table 2 is sent from gateway 113 to client 121. Data indicating the message type "ISAKMP Config Mode reply" is included in ISAKMP message type field 236. The number 16529 indicating CFG_MODE_GENEREIC_POLSERV_TYPE is included in the attribute type field 242. The AF field 241 is set to 1, indicating the attribute value has the default 2 bytes size, so that an attribute length field 244 is not transmitted. Data indicating the attribute value "1" is in the attribute value field 246. According to Table 1, policy server type 1 indicates RADIUS. Therefore, in this example, requests placed in the values of generic attributes in subsequent ISAKMP messages for client configuration are formatted according to RADIUS.

In some embodiments, in which the policy server is established as one type, such as a RADIUS server, for all clients steps 410 and 420 are omitted.

In step 430, the client forms a policy server specific request for client security configuration information. For example, the client 121 forms a RADIUS protocol request for at least In step 440, an ISAKMP Config Mode request message is sent having the generic tag as an attribute type and the policy server specific request for client configuration information as the attribute value. For example, an ISAKMP Config Mode request message 322 with fields as specified in message 3 of Table 2 is sent from client 121 to gateway 113. Data indicating the message type "ISAKMP Config Mode request" is included in ISAKMP message type field 236. The number 16528 indicating CFG_MODE_GENEREIC_ATT is included in the attribute type field 242, tagging the attribute value as a generic attribute type not to be interpreted by the gateway. The AF field 241 is set to 0, indicating the length of the attribute value is in the attribute length field 244. The attribute length field 244 includes data indicating the length is 65 bytes (each byte corresponds to one alpha-numeric character in this example). The 65 character string, which indicates the RADIUS specific requests and is in the attribute value field 246, is given by Avpair="ike-mode-config:firewall_policy;ipsec:software_update_url".

In the example of message 3 of Table 2, all RADIUS specific requests for client security configuration information are placed in the attribute value of one ISAKMP attribute, e.g. ISAKMP attribute 240 in FIG. 2. In other embodiments, each separate RADIUS specific request is placed in a separate ISAKMP attribute. In such embodiments, the example two RADIUS specific requests, one for the firewall policy, the other for the software update URL, would be separated into two different ISAKMP attributes. Each of these two ISAKMP attributes have the same ISAKMP attribute type, e.g., 16528, indicating a CFG_MODE-GENERIC_ATT, which is not interpreted by the gateway, but passed on to the policy server.

In step 450, the client receives an ISAKMP reply including an attribute having the tag as the attribute type, and a policy server specific response as the attribute value. For example, an ISAKMP Config Mode reply message 338 with fields as specified in message 4 of Table 2 is received by client 121 from gateway 113, after gateway 113 has exchanged messages with the security policy server 115. Data indicating the message type "ISAKMP Config Mode reply" is included in ISAKMP message type field 236. The number 16528 indicating CFG_MODE_GENEREIC_ATT is included in the attribute type field 242, tagging the attribute value as a generic attribute type not interpreted by the gateway. The AF field 241 is set to 0, indicating the length of the attribute value is in the attribute length field 244. The attribute length field 244 includes data indicating the length is 128 bytes. The 128 character string represents the RADIUS response, which lists for each of the requested attributes, the attribute name, an equals sign ("="), and a set of one or more values for the attribute. The attributes are separated by semicolons. It is assumed for purposes of illustration that the RADIUS response string is Avpair="ike-mode-config:firewall_policy=deny in tcp 22-80 udp;
    ipsec:software_update_url=http://vpnupdate.x.com update_mandatory".

This RADIUS specific response is in the attribute value field 246.

In the example of message 4 of Table 2, all RADIUS specific responses for client security configuration information are placed in the attribute value of one ISAKMP attribute, e.g. ISAKMP attribute 240 in FIG. 2. In other embodiments, each separate RADIUS specific response is placed in a separate ISAKMP attribute. In such embodiments, the example two RADIUS specific responses, one giving the firewall policy, the other giving the software update URL, would be separated into two different ISAKMP attributes. Each of these two ISAKMP attributes have the same ISAKMP attribute type, e.g., "16528," indicating a CFG_MODE-GENERIC_ATT, which is not interpreted by the gateway, but passed on to the client.

In step 460, the client is configured for secure communications based at least in part on the policy server specific response. In the above example, the RADIUS specific responses are interpreted by the client and cause the client to implement the given firewall policy and to download IPSec software from the given URL. For purposes of illustration, it is assumed that the firewall policy response causes the client to institute the policy of denying access to all inbound data packets using the transmission control protocol (TCP) arriving at ports 22 through 80, and denying access to all inbound UDP traffic.

In many embodiments, one or more other ISAKMP attributes are included in message 338, or subsequent ISAKMP responses. These other ISAKMP attributes provide client security configuration information that is interpreted by the gateway for secure communications between client and gateway. Such gateway interpreted attributes might include, for example, one or more of: the IP address of the client; the encryption algorithm; the hash function; the exchange algorithm; one or more exchange algorithm parameters; a lifetime of IPSec sessions; and particular key values, among others. Attribute types for such attributes do not equal the tag used for generic attributes, but, instead, identify one or more of these attributes interpreted by the gateway.

3.2 Security Gateway

Figure 5:
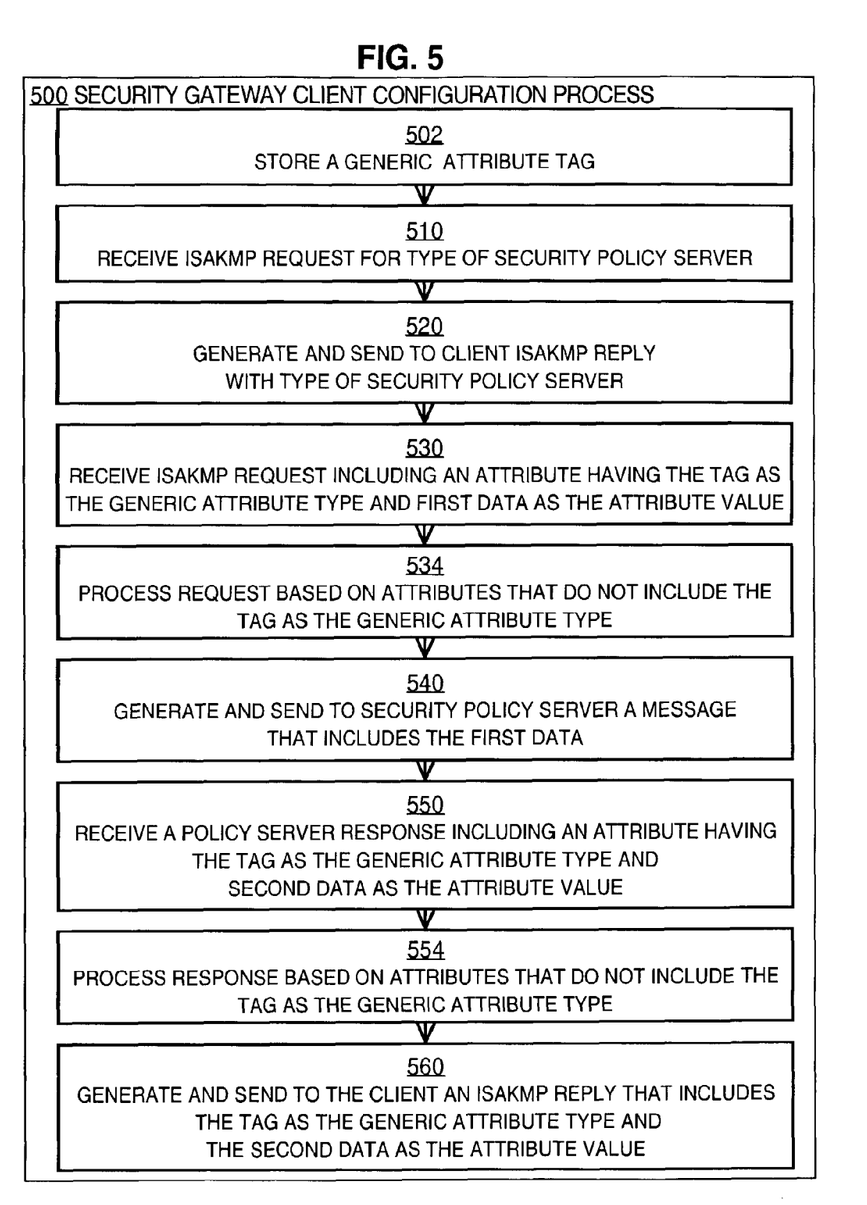
FIG. 5 is a flow diagram that illustrates a high level overview of one embodiment of a method for passing configuration information at the security gateway.

FIG. 5 is a flow diagram that illustrates a high level overview of one embodiment of a method 500 for passing client configuration information at the security gateway. In step 502, a generic attribute tag for Config Mode is generated and stored. For example, the generic attribute tag "16528" named CFG_MODE_GENERIC_ATT is generated by the client and in step 502 the gateway obtains the tag, and stores the tag locally for use in subsequent steps by the gateway. In some embodiments, step 502 includes generating and storing a security policy server type tag. For example, the generic attribute tag 16529 named CFG_MODE_GENERIC_POLSERV_TYPE is generated by the client; and in step 502, the gateway obtains the tag and stores it locally, and generates it for use in subsequent steps by the gateway by retrieving it from storage.

In step 510, an ISAKMP Config Mode request message requesting the type of the security policy server is received from the client. For example, an ISAKMP Config Mode request message 310 with fields as specified in message 1 of Table 2 is received by gateway 113 from client 121.

In step 520, an ISAKMP Config Mode reply message with the type of the security policy server is generated and sent to the client. For example, an ISAKMP Config Mode reply message 312 with fields as specified in message 2 of Table 2 is sent by gateway 113 to client 121.

In step 530, an ISAKMP Config Mode request message is received, which includes the generic configuration attribute tag as a value of the attribute type and a policy server specific request as the attribute value. The value is opaque first data as far as the gateway is concerned. For example, an ISAKMP Config Mode request message 322 with fields as specified in message 3 of Table 2 is received by gateway 113 from client 121.

In step 534, the gateway processes the ISAKMP Config Mode request message based on attributes that are interpreted by the gateway. The gateway does not interpret or otherwise parse or divide the data in the attribute value field 246 of the ISAKMP attribute that has the generic configuration attribute tag in the attribute type field 242. For example, gateway 113 does not interpret the string Avpair=ike-mode-config:firewall_policy;ipsec:software_update_url."

in the attribute value having attribute type 16528 in example message 3 of Table 2.

In step 540, the gateway generates and sends to a security policy server, a security policy server message that includes the opaque first data extracted from the attribute value of attribute type 16528. Other data may be included in the message sent to the security policy server, such as policy server specific requests for configuration information interpreted by the gateway 113. For example, a RADIUS protocol message 324 is sent to security policy server 115 from gateway 113 with portions as specified in message 1 of Table 3. Data indicating a request for an IP address on a virtual private network is included in portion A, which is interpreted by the gateway 113. Data indicating the client requests for a firewall policy and software update URL is included in portion B, which is not interpreted by the gateway 113. In some embodiments, portion B includes the tag 16528 and an equals sign with the contents of the attribute value field 246 enclosed in quotes, which indicates that the data enclosed in the outermost quotes is a set of one or more policy server specific requests not interpreted by the gateway 113.

TABLE 3

Example portions of example RADIUS messages.

| example message number | RADIUS message type | portion A | portion B |
|---|---|---|---|
| 1 | configuration request | Avpair= "ike-mode-config: client_ip" | Avpair= "ike-mode-config:firewall_policy; ipsec:software_update_url" |
| 2 | configuration response | Avpair= "ike-mode-config: client_ip= 100.111.122.047" | 16528='Avpair= "ike-mode-config:firewall_policy= deny in tcp 22-80 udp; ipsec:software_update_url=http:// vpnupdate.x.com update_mandatory"' |

In step 550, the gateway receives, from the security policy server, a security policy server response message that includes opaque second data associated with the generic attribute type tag. Other data may be included in the message received from the security policy server, such as policy server specific requests for configuration information interpreted by the gateway 113. For example, a RADIUS protocol response message 332 is received by gateway 113 from security policy server 115 with portions as specified in message 2 of Table 3. Data indicating a response for an IP address on a virtual private network is included in portion A, which is interpreted by the gateway 113. Data indicating the responses for a firewall policy and software update URL is included in portion B which is opaque second data not interpreted by the gateway 113. Portion B includes the tag 16528 and an equals sign with the opaque second data enclosed in quotes, which indicates that the data enclosed in the outermost quotes is a set of one or more policy server specific responses for the client, which are not interpreted by the gateway 113.

In step 554, the gateway processes the policy server specific response message based on attributes that are interpreted by the gateway. The gateway does interpret or otherwise parse or divide the data in the portion of the policy server response message that has the generic configuration attribute tag. For example, gateway 113 does not interpret the string Avpair="ike-mode-config:firewall_policy=deny in tcp 22-80 udp; ipsec:software_update_url=http://vpnupdate.x.com update_mandatory"

in portion B of the example message 2 of Table 3 between the quotes following the equal sign after the generic attribute tag 16528.

In step 560, the gateway generates and sends to the client, an ISAKMP Config Mode reply message that includes the opaque second data extracted from portion B after the generic attribute tag 16528. Other data may be included in the ISAKMP Config Mode response message sent to the client, such as policy server specific responses for configuration information interpreted by the gateway 113. For example, ISAKMP Config Mode reply message 338 is sent to client 121 from gateway 113 with fields as specified in message 4 of Table 2. Data indicating a response for an IP address on a virtual private network is included in an attribute that is interpreted by the gateway 113 in other ISAKMP attributes, not listed in Table 2. Data indicating the set of policy server responses for a firewall policy and software update URL is included in attribute value field 246, which is not interpreted by the gateway 113.

3.3 Security Policy Server

Figure 6:
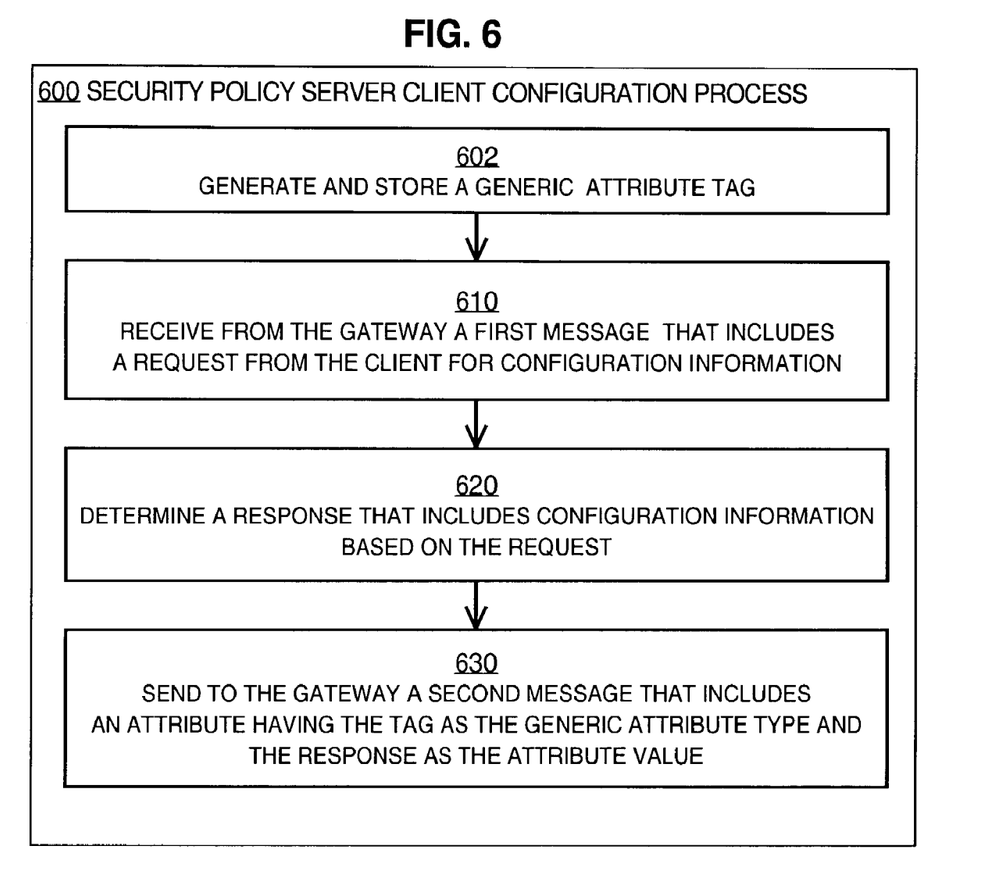
FIG. 6 is a flow diagram that illustrates a high level overview of one embodiment of a method for passing configuration information at the security policy server.

FIG. 6 is a flow diagram that illustrates a high level overview of one embodiment of a method 600 for passing client configuration information at the security policy server. It is assumed that before performing the steps of FIG. 6, a client has generated a request for a policy server, and has encapsulated the request with a generic attribute tag for Config Mode as defined herein. It is further assumed that the gateway has received the request, removed the Config Mode wrapper, leaving only the client request for the policy server, and forwarded the request to the policy server. For example, the generic attribute tag 16528 named CFG_MODE_GENERIC_ATT is generated by the client.

In step 610, the security policy server receives, from the gateway, a policy server request message that includes a request from the client for client configuration information that is not interpreted by the gateway, and is encapsulated in a generic attribute tag. Other data may be included in the message received by the security policy server, such as policy server specific requests for configuration information interpreted by the gateway 113. For example, RADIUS protocol message 324 is received by security policy server 115 from gateway 113 with portions as specified in message 1 of Table 3. Data indicating a request for an IP address on a virtual private network is included in portion A, which is interpreted by the gateway 113. Data indicating the client requests for a firewall policy and software update URL is included in portion B, which is not interpreted by the gateway 113. The policy server recognizes the attributes firewall_policy and software_update_url as IKE attributes not known to the ISAKMP gateway. In some embodiments, portion B includes the tag 16528 and an equals sign with the contents of the attribute value field 246 enclosed in quotes, which indicates that the data enclosed in the outermost quotes is a set of one or more policy server specific requests not interpreted by the gateway 113.

In step 620, the policy server determines a response that includes client configuration information, based on the request that was not interpreted by the gateway. The policy server interprets the policy server specific requests in the request message. For example, security policy server 115 does interpret the string Avpair="ike-mode-config:firewall_policy;ipsec:software_update_url".

Based on the two requests in this string, the security policy server determines the responses, which are given by the string

---

Avpair="ike-mode-config:firewall_policy=deny in tcp 22-80 udp; ipsec:software_update_url=http://vpnupdate.x.com update_mandatory".

--- as described above.

In step 630, the security policy server sends, to the gateway, a policy server response. The gateway is responsible to re-package the response with the generic attribute tag in association with the response to the client request, before forwarding the response to the client. Other data may be included in the message sent from the security policy server, such as policy server specific requests for configuration information interpreted by the gateway 113. For example, a RADIUS protocol response message 332 is sent to gateway 113 by security policy server 115 with portions as specified in message 2 of Table 3. Data indicating a response for an IP address on a virtual private network is included in portion A, which is interpreted by the gateway 113. Data indicating the responses for a firewall policy and software update URL is included in portion B which is opaque second data not interpreted by the gateway 113. Portion B includes the tag 16528 and an equals sign with the opaque second data enclosed in quotes, which indicates to the gateway that the data enclosed in the outermost quotes is a set of one or more policy server specific responses for the client, which are not interpreted by the gateway 113.

Thus, at least some security client configuration information is provided to a security client from a security policy server without interpretation by a security gateway. Such provisioning of security configuration information for the client allows client configuration extensions to be added by modifying the policy server or security client, or both, without modifying the gateway 113.

3.4 Alternative Information-Passing Approach

In an alternative embodiment, a client may communicate requests to a policy server without the client having knowledge, in terms of programming, about details of the policy server. In this approach, the policy server and client communicate using messages that contain one or more character strings that include an attribute name and a value for the attribute. The gateway does not interpret the string, but simply passes the messages to the policy server. Upon receipt of such a message, the policy server parses the strings and extracts the attributes. The policy server then encapsulates the attributes, using its native policy server protocol (e.g., RADIUS, Diameter, TACACS+, etc.), into generic-attribute types within Config Mode. The policy server passes the encapsulated generic-attribute types to the client.

If a gateway receives a message containing one or more generic-attributes directed from the client to the policy server, similar processing is performed. The gateway forwards a string containing the generic-attributes to the policy server, without manipulating or examining the string, in a message having a suitable form as determined by the protocol then used by the policy server.

In embodiments that use TACACS+, the character strings are in the form "attribute=value". In embodiments that use RADIUS, the strings may comprise one or more cisco-avpair objects, the format of which matches the TACACS+ string format.

4.0 Implementation Mechanisms—Hardware Overview

Figure 7:
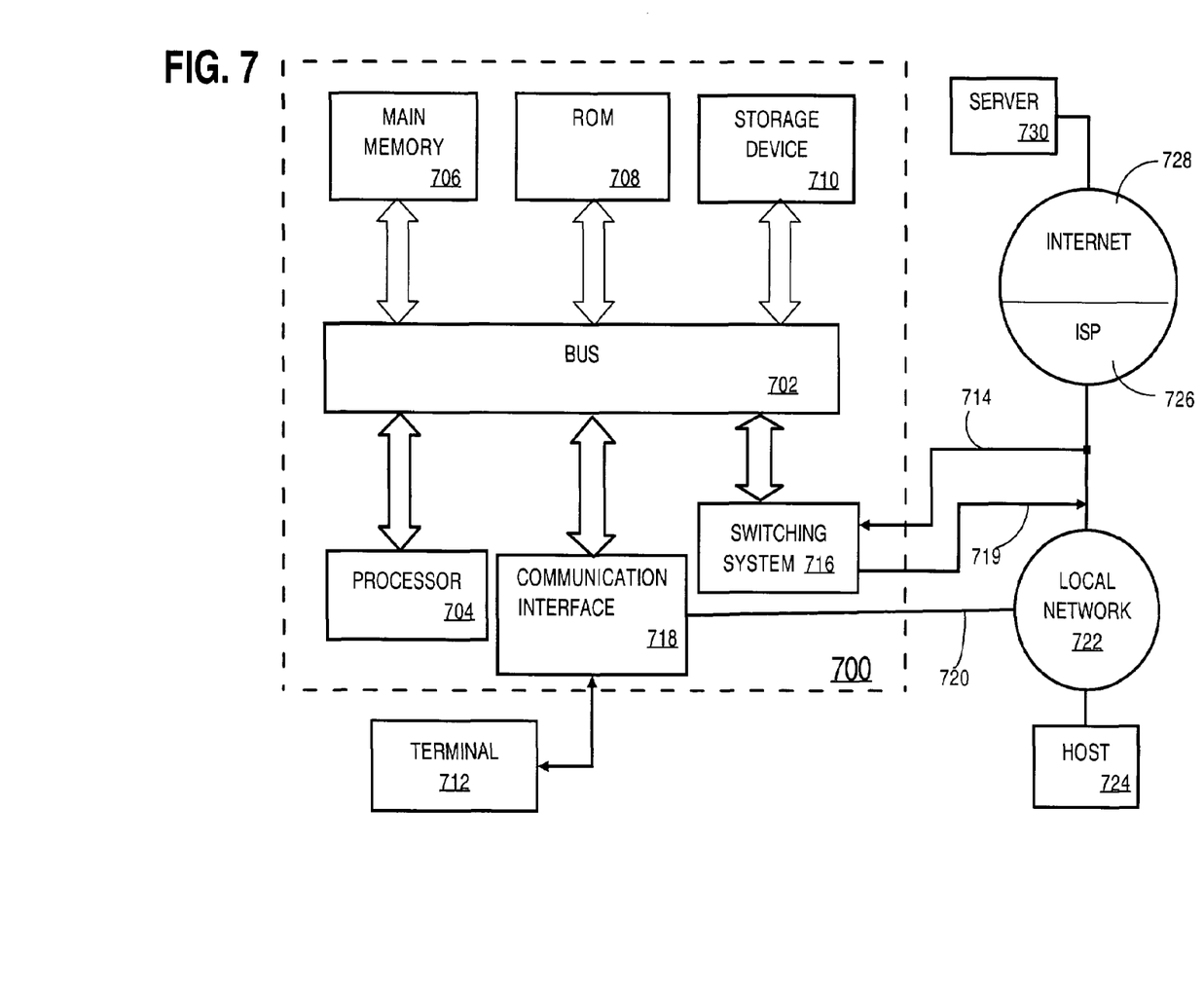
FIG. 7 is a block diagram that illustrates a computer system, such as a router, upon which an embodiment may be implemented.

FIG. 7 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 714. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Internet 728.

The invention is related to the use of computer system 700 for passing security configuration information between a security policy server and a client. According to one embodiment of the invention, a security gateway for passing security configuration information between a security policy server and a client is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for a client to be configured for secure communications as described herein.

The received code may be executed by processor 704 as it is received, and/or stored in storage device 710, or other non-volatile storage for later execution. In this manner, computer system 700 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   forming a request of a security policy server for security configuration information;
   causing a security gateway to (a) receive the request in an Internet Security Association and Key Management Protocol (ISAKMP) network message, (b) treat the request received in the ISAKMP network message as opaque data, and (c) send the request to the security policy server;
   receiving the security configuration information from the security gateway;
   using the security configuration information to establish secure network communications;
   wherein causing the security gateway to receive the ISAKMP network message comprises sending the ISAKMP network message to the security gateway;
   wherein causing the security gateway to treat the request received in the ISAKMP network message as opaque data comprises associating the request with a tag in the ISAKMP network message sent to the security gateway, the tag indicating that the request is to be treated as opaque data; and
   wherein the method is performed by a computing device.

2. A method according to claim 1, wherein receiving the security configuration information from the security gateway comprises receiving the security configuration information from the security gateway in an Internet Security Association and Key Management Protocol (ISAKMP) network message.

3. A method according to claim 1, wherein forming the request of the security policy server for security configuration information comprises forming the request according to a protocol for the security policy server.

4. A method according to claim 1, wherein the method further comprises performing:
before forming the request of the security policy server for security configuration information:
forming a security policy server type request of the security policy server for security policy server type information;
causing the security gateway to (a) receive the security policy server type request in an Internet Security Association and Key Management Protocol (ISAKMP) network message, (b) treat the security policy server type request as opaque data, and (c) send the security policy server type request to the security policy server;
receiving the security policy server type information from the security gateway; and
wherein forming the request of the security policy server for security configuration information comprises forming the request based on the security policy server type information.

5. A method comprising:
receiving, from a client, an Internet Security Association and Key Management Protocol (ISAKMP) network message comprising a request of a security policy server for security configuration information;
wherein the ISAKMP network message comprises the request in association with a tag indicating that the request is to be treated as opaque data;
treating the request received in the ISAKMP network message as opaque data;
sending the request to the security policy server;
receiving the security configuration information from the security policy server;
treating the security configuration information as opaque data;
sending the security configuration information to the client; and
wherein the method is performed by a computing device.

6. A method according to claim 5, wherein sending the security configuration information to the client comprises sending the security configuration information to the client in an Internet Security Association and Key Management Protocol (ISAKMP) network message.

7. A method according to claim 5, wherein the method further comprises:
before receiving, from the client, the Internet Security Association and Key Management Protocol (ISAKMP) network message comprising the request of the security policy server for security configuration information:
receiving, from the client, an Internet Security Association and Key Management Protocol (ISAKMP) network message comprising a security policy server type request of the security policy server for security policy server type information;
treating the security policy server type request as opaque data;
sending the security policy server type request to the security policy server;
receiving the security policy server type information from the security policy server;
treating the security policy server type information as opaque data; and
sending the security policy server type information to the client;
wherein the method is performed by a computing device.

8. A method comprising:
forming a response to a request from a client for security configuration information; and
causing a security gateway to (a) receive the response in an Internet Security Association and Key Management Protocol (ISAKMP) network message, (b) treat the response received in the ISAKMP network message as opaque data, and (c) send the response to the client;
wherein causing the security gateway to receive the ISAKMP network message comprises sending the ISAKMP network message to the security gateway;
wherein causing the security gateway to treat the request received in the ISAKMP network message as opaque data comprises associating the request with a tag in the ISAKMP network message sent to the security gateway, the tag indicating that the request is to be treated as opaque data; and
wherein the method is performed by a computing device.

9. A method according to claim 8, wherein the method further comprises:
before forming the response to the request from the client for security configuration information:
forming a security policy server type response to a security policy server type request from the client for security policy server type information; and
causing a security gateway to (a) receive the security policy server type response, (b) treat the security policy server type response as opaque data, and (c) send the security policy server type response to the client.

10. A non-transitory computer-readable medium storing processor executable instructions which, when executed by one or more processors, causes the one or more processors to perform a method according to claim 1.

11. A non-transitory computer-readable medium storing processor executable instructions which, when executed by one or more processors, causes the one or more processors to perform a method according to claim 2.

12. A non-transitory computer-readable medium storing processor executable instructions which, when executed by one or more processors, causes the one or more processors to perform a method according to claim 3.

13. A non-transitory computer-readable medium storing processor executable instructions which, when executed by one or more processors, causes the one or more processors to perform a method according to claim 4.

14. A non-transitory computer-readable medium storing processor executable instructions which, when executed by one or more processors, causes the one or more processors to perform a method according to claim 5.

15. A non-transitory computer-readable medium storing processor executable instructions which, when executed by one or more processors, causes the one or more processors to perform a method according to claim 6.

16. A non-transitory computer-readable medium storing processor executable instructions which, when executed by one or more processors, causes the one or more processors to perform a method according to claim 7.

17. A non-transitory computer-readable medium storing processor executable instructions which, when executed by one or more processors, causes the one or more processors to perform a method according to claim 8.

18. A non-transitory computer-readable medium storing processor executable instructions which, when executed by one or more processors, causes the one or more processors to perform a method according to claim 9.

19. A security gateway computing device configured to:
receive, from a client, an Internet Security Association and Key Management Protocol (ISAKMP) network message comprising a request of a security policy server for security configuration information;
wherein the ISAKMP network message comprises the request in association with a tag indicating that the request is to be treated as opaque data;
treat the request received in the ISAKMP network message as opaque data;
send the request to the security policy server;
receive the security configuration information from the security policy server;
treat the security configuration information as opaque data; and
send the security configuration information to the client.

20. A system comprising:
a client computing device configured to:
form a request of a security policy server computing device for security configuration information;
send the request to a security gateway computing device in an Internet Security Association and Key Management Protocol (ISAKMP) network message; and
wherein the ISAKMP network message comprises the request in association with a tag indicating that the request is to be treated as opaque data;
the security gateway computing device configured to:
receive the ISAKMP network message from the client computing device;
treat the request received in the ISAKMP network message in the ISAKMP network message as opaque data;
send the request to the security policy server computing device;
receive the security configuration information from the security policy server computing device;
treat the security configuration information as opaque data; and
send the security configuration information to the client computing device.

21. A system comprising:
a security gateway computing device configured to:
receive, from a client, an Internet Security Association and Key Management Protocol (ISAKMP) network message comprising a request of a security policy server computing device for security configuration information;
wherein the ISAKMP network message comprises the request in association with a tag indicating that the request is to be treated as opaque data;
treat the request received in the ISAKMP network message as opaque data;
send the request to the security policy server computing device;
receive the security configuration information from the security policy server computing device;
treat the security configuration information as opaque data; and
send the security configuration information to the client;
the security policy computing device configured to:
form a response to the request from the client for security configuration information; and
send the response to the security gateway computing device.

22. A method according to claim 1, wherein the tag comprises the value 16528 indicating that the request is to be treated as opaque data.

* * * * *